United States Patent Office 3,126,394
Patented Mar. 24, 1964

3,126,394
CRYSTALLIZING 2,2'-DITHIOBISBENZOTHIAZOLE
Daniel H. Gold, Plainfield, N.J., assignor to American Cyanamid Company, New York, N.Y., a corporation of Maine
No Drawing. Filed Feb. 27, 1961, Ser. No. 91,640
9 Claims. (Cl. 260—306.5)

The present invention relates to an improved crystalline form of 2,2'-dithiobisbenzothiazole and to the process for preparing it. More particularly, it relates to 2,2'-dithiobisbenzothiazole crystals of larger than normal particle size and having superior dispersion properties in natural and synthetic elastomers.

2.2'-dithiobisbenzothiazole is a commonly used accelerator in the rubber industry and will be hereinafter referred to for purposes of simplification as "MBTS." One of its unfortunate characteristics is its limited solubility in rubber stocks. It is, therefore, important to obtain good separation of the individual particles and uniform dispersion thereof when they are incorporated into rubber. If any of the particles are not completely and uniformly dispersed, they remain in the form of agglomerates of encapsulated powder within the polymer matrix. Some areas of the rubber matrix will have a lower than desired local concentration of MBTS and will be undercured. Other areas will have a much higher than desired local concentration and will be over-cured. As a result, weak spots will occur in the vulcanized product.

To eliminate this difficulty, many rubber processors employ a technique known as refining. In this process the rubber-MBTS blend is put through a very closely spaced pair of rollers so that the larger agglomerates of undispersed MBTS are pushed to the end of the sheet and can be cut off. The smaller agglomerates, unfortunately, still remain in the rubber and the technique is, therefore, only partially effective.

With the ever-increasing trend to automation and high production rates in the rubber processing industry, improvement in the dispersion characteristics of MBTS is highly important. It would not only result in more uniform cures but eliminate the necessity for the "refining" operation. It would also have the advantage of permitting master batching at higher MBTS concentration levels.

According to the present invention it has been found that the dispersion of MBTS can be improved by increasing the average particle size of the MBTS solids. In equivalent terms, this means decreasing the total surface area per given weight of MBTS. In general, this is accomplished by the use of a heterogeneous solvent system in which an organic solvent is added to the aqueous medium in recovering the MBTS product.

To properly define the exact way in which particle size and application properties relate one to another, it will be necessary to delineate the test conditions used in developing this invention. Particle size determinations present no special problems. They were made using conventional microscopical examination techniques. In all cases, the samples were immersed in mineral oil so that the individual particles were clearly visible. However, there is no suitable rubber application test which is standard in the industry. The test used is believed to fairly evaluate the dispersion properties of MBTS.

In the test which was used, 180 g. of natural rubber (pale crepe No. 1 thin sheets) is masticated in the conventional manner until a Mooney viscosity value of 65 ML-4 at 212° F. is obtained. It is then allowed to cool to room temperature and placed on a twelve inch roller mill, operated at 60° C. The mill opening is adjusted to 0.015" and the rubber allowed to form a sheet on the roller. After 1.5 minutes, the mill opening is readjusted to 0.025" and the rubber allowed to roll for another 0.5 minute. At this point, over a one minute period, 45 g. of MBTS is distributed uniformly over the surface. Normally, some so-added MBTS does not immediately enter the polymer phase. It becomes pressed onto the back roller and cakes thereupon. Some MBTS flakes off this back roller and falls onto the shelf underneath. This material is immediately collected and redistributed onto the rubber surface. The rubber is allowed to roll for a total of four minutes from the time MBTS addition is started. Any MBTS still caked on the back roller at the end of this time is scraped off and redistributed onto the rubber until all of it is incorporated therein.

The time required to incorporate all the MBTS into the rubber is measured from the time MBTS distribution is started. If all of the MBTS were to be incorporated as rapidly as added, the incorporation time would be one minute. If any remains on the back roller after the four minutes, the incorporation time is recorded as four plus (4.0+) minutes.

After all the MBTS is incorporated, the sheet is cut five times from each side to obtain more uniform distribution of the MBTS. The sheet is then cut from the roller, the mill opened to 0.035" and the sheet upended four times through the mill. Finally, it is sheeted out at a thickness of 0.035" and allowed to cool to room temperature.

After cooling, a section of rubber sheet is stretched sufficiently so that an area of 10–12 square inches becomes translucent when held in front of a strong light. The thickness of the stretched-out section is about 0.005–0.010". Any agglomerates of MBTS or pockets of encapsulated powder remain opaque and are clearly visible to the naked eye.

For purposes of evaluating the dispersion of MBTS in any given sample, it is necessary to determine both the size and number of agglomerates present therein. The rating value ranges used in this invention are shown in Tables I and II.

TABLE I

Agglomerate Size Range

| Qualitative Description of Agglomerate Size | Actual Agglomerate Size Range (millimeters) |
|---|---|
| Large | greater than 0.5. |
| Moderate | 0.1–0.5. |
| Small | less than 0.1. |

TABLE II

Dispersion Rating Scale

| Assigned Rating | Number of Agglomerates per Examined Section | | |
|---|---|---|---|
| | Large | Moderate | Small |
| Very poor | 100–300 | above 300 | |
| Poor | 10–100 | 100–300 | |
| Poor–Fair | below 10 | 10–50 | 100–300 |
| Fair | below 10 | above 10 | 10–100 |
| Fair–Good | 0 | above 10 | 10–100 |
| Good | 0 | 0 | 10–50 |

Having defined these terms and the testing method, it is possible to show the correlation of MBTS particle size with dispersion and incorporation characteristics. A large number of MBTS samples of varying particle size range were so tested. A summary of illustrative results is shown in the following table, Table III.

TABLE III
MBTS Incorporation vs. Particle Size

| Particle Size [1] | Dispersion Rating | Incorporation Time [2] |
|---|---|---|
| 5–10 | very poor | 4.0+ |
| 5–20 | do | 4.0+ |
| 5–20 | poor | 4.0+ |
| 5–20 | do | 4.0+ |
| 5–20 | poor-fair | 4.0+ |
| 5–20 | do | 4.0+ |
| 10–60 | fair | 4.0+ |
| 10–80 | fair-good | 4.0+ |
| 10–80 | do | 4.0+ |
| 10–210 | good | [3] 4.0+ |
| 10–220 | do | 1.75 |

[1] Microns.
[2] Minutes.
[3] All but several small spots incorporated in 2.0 minutes.

Table III clearly shows that as the particle size distribution is shifted upward, an improvement in dispersion results. The incorporation time response is less clearly defined, although there are marked qualitative improvements as the particle size distribution is raised. However, this effect is somewhat beclouded due to the importance of particle shape factors, whereas the shape factor appears to be relatively unimportant in determining dispersion. Thus, a large round particle is less likely to be caked onto the back roll by the rubber sheet than will a flat particle, whereas both will disperse equally well if their surface areas are equal.

The most commonly encountered method for manufacturing MBTS is the chlorine oxidation of an aqueous solution of sodium mercaptobenzothiazole (MBT). MBTS is only slightly soluble in water. Accordingly, as so-manufactured, it is usually produced as small particles. By weight, most of the particle size distribution is about in the 5–30 micron range. By number, it is usually in about the 1–3 micron range. At best, such a product will show only a poor-fair dispersion rating in the aforementioned test. It is possible to modify the usual chlorination conditions of the sodium MBT to obtain a product in a slightly larger particle size range. However, the degree of improvement obtained is variable. The product crystal size is strongly dependent on the purity of the sodium MBT solution used. This in turn is beset by too many variable difficulties for a reliable controlled commercial operation. Somewhat larger MBTS particle size (10–100 microns) can be obtained under certain conditions by employing a peroxide oxidation agent. However, the cost of the oxidant is about five times as high as for chlorine oxidation and this method is too uneconomical for practical large volume production.

A well known chemical technique for increasing the product particle size when small particles are originally obtained is by recrystallization. It involves solution of the product solids in a suitable solvent medium and reprecipitation of the solids, either by changing it solubility in the solvent (such as by cooling the solvent or introducing a third component into the solvent) or by physically removing the solvent. In the present invention, both basic techniques have been adapted to recrystallize MBTS directly during production without the necessity for prior separation of the MBTS from the reaction medium in which it is manufactured.

In the first, the hot aqueous reaction product slurry of MBTS, the aqueous medium containing its normal content of dissolved inorganic salts, is contacted with the hot selective solvent. The resultant two-phase system is stirred to extract the MBTS into the solvent. The two-phase system is then cooled to reprecipitate most of the MBTS, and the latter is separated out by conventional means, as by filtration. The solvent phase is separated and recycled to treat additional slurry.

In the second, the same aqueous MBTS product slurry is contacted with the solvent and stirred to extract the MBTS. The solvent is then removed by distillation, thus reprecipitating the MBTS into the original brine, and it is separated therefrom as by filtration. The solvent, of course, is recovered and recycled to treat additional slurry.

In U.S. Patent 2,475,582 a method is described for improving the separation of suspended MBTS particles from an aqueous slurry containing particles too small to permit adequate settling in any practical time. This method comprises adding to the aqueous slurry a small amount of a chemically inert, water-immiscible, organic solvent for MBTS. However, the amount of solvent used is required to be insufficient to completely dissolve the MBTS. The slurry is stirred for sufficient time to partially agglomerate MBTS particles into free-settling masses. However, the increase in overall average particle size obtained by this procedure is negligible in terms of the size increase which is desirable in accordance with the present invention.

In the practice of the present invention, for reasons of safety and economy, chlorobenzene is the preferred solvent. However, other water-immiscible solvents may be used. Typical organic solvents which are operative in this process include the following: hydrocarbons, such as benzene, toluene, xylene, coal tar naphthas, cymene, cyclohexane, various petroleum hydrocarbons, e.g., high-flash naphtha, decalin, tetralin, mesitylene, mixed hexanes and the like; chloro hydrocarbons, such as chloroform, ethylene dichloride, tetrachloroethane, perchloroethylene, carbon tetrachloride and chlorobenzene; nitro hydrocarbons, such as nitrobenzene, nitrotoluene, nitroxylene, nitrocymenes, and the nitroparaffins; aniline and aniline derivatives such as methylaniline and dimethylaniline; various esters such as the butyl, amyl and benzyl esters of propionic, butyric and lactic acids, ethylene glycol diacetate and the like.

For maximum benefit, the amount of organic solvent used must be sufficient to dissolve the MBTS completely. As noted above, the amount of improvement obtained by following the procedure of U.S. Patent No. 2,475,582 wherein only partial solution is produced, is very small. Dispersion is improved from poor only to poor-fair as a result of such treatment. Good dispersion ratings can only be obtained when sufficient solvent is added to completely dissolve the MBTS.

The two basic procedures of the present invention noted above may be subdivided into further modifications. For instance in the first method, the hot solvent containing the MBTS (a) may be separated from the aqueous brine before the solvent is cooled; (b) cooled in the presence of the brine; (c) separated from the brine and then flashed into a vacuum chamber to obtain rapid solvent cooling; (d) the solvent is not separated from the brine before recrystallization by flash evaporation.

In the second procedure, (a) the hot solvent may be separated from the aqueous brine and the solvent removed, as by steam or thermal distillation; (b) the solvent need not be separated from the brine before being removed by distillation; or (c) the two-phase emulsion of brine and solvent may be fed continuously to some suitably equipped vessel wherein the solvent is continuously removed by distillation and concurrently product is removed by conventional means so as to form a balanced flow system wherein MBTS is continually being recrystallized with a continuous recycle of the solvent.

In general, where the facilities are available, one of the procedures using distillation, i.e., of the second modification, is preferred. Of the distillation procedures, that of a balanced continuous operation is preferred.

In industrial use of MBTS, zinc palmitate is customarily added to finished MBTS slurry before the solids are filtered and dried. This aids the incorporation of the MBTS and decreases the back roll flake-off. It is an advantage of this invention that this can be conveniently carried out in any one of several ways, each compatible with its appropriate recrystallization system. For example, the desired concentration of zinc palmitate can be dissolved in the solvent prior to bringing the latter into contact with MBTS slurry. The zinc salt will precipitate with the MBTS and be found in the final product. The desired concentration of zinc palmitate also can be dispersed in water with the aid of a suitable wetting agent and blended with the aqueous MBTS slurry prior to the solvent contact, the additive again precipitating with the MBTS product solids. In another procedure, zinc palmitate, either dissolved in a solvent or dispersed in water, can be added to the final recrystallized MBTS slurry and again be recovered with the dry product.

In general, MBTS products conditioned according to the process of this invention have a particle size range between about ten and about 200 microns. Distribution of particles is fairly uniform throughout the entire range.

This invention will be more fully illustrated in conjunction with the following examples which are intended for that purpose. Unless otherwise noted, all parts and percentages are by weight and temperatures are in degrees centigrade. The particle size range is given for substantially the whole product on a weight basis, there usually being some small fractions by weight which are outside the range in both directions.

EXAMPLE 1

A mixture of 4,000 parts of a 3% aqueous solution of sodium chloride, 200 parts of MBTS and 1600 parts of chlorobenzene is heated at 95° C., with stirring until the MBTS is dissolved in the chlorobenzene. Stirring is stopped and the two liquid phases allowed to completely separate. The chlorobenzene solution of MBTS is separated from the aqueous phase and allowed to cool to 50° C. with very slow slow stirring. Precipitated MBTS is then collected by filtration and dried. Comparison of the original MBTS and the final product is shown in the following table.

TABLE IV

|  | Initial Product | Final Product |
|---|---|---|
| Particle Size | 5-20 microns | 10-200 microns. |
| Dispersion Rating | poor | good. |
| Incorporation Time | 4.0+ minutes | 3 min., 20 sec. |

EXAMPLE 2

The procedure of Example 1 is repeated except that the chlorobenzene phase is not separated, but is allowed to cool to 50° C. in the presence of the aqueous brine. The product, after separation by filtration and drying, has essentially the same characteristics as those shown for the final product in Table IV.

EXAMPLE 3

The procedure of Example 1 is followed, with the exception that after separation of the hot chlorobenzene phase from the aqueous phase, the hot MBTS solution is passed through a filter paper into a vacuum chamber having a pressure equivalent to 65 millimeters of mercury. The temperature of the chlorobenzene solution thus quickly decreases from about 95° to about 60° C., thereby precipitating MBTS crystals. The precipitate is filtered from the chlorobenzene at 60° C. and dried. The characteristics of the MBTS before and after recrystallization are shown in the following table, Table V.

TABLE V

|  | Initial Product | Final Product |
|---|---|---|
| Particle Size | 5-20 microns | 10-220 microns. |
| Dispersion Rating | poor | good. |
| Incorporation Time | 4+ minutes | 3 min., 20 sec. |

EXAMPLE 4

The procedure of Example 3 is followed, with the exception that the chlorobenzene solution is not separated from the aqueous brine. The combined phases are passed through filter paper into a vacuum chamber having a pressure of about 215 millimeters of mercury, thereby causing a temperature drop from about 95° C. to about 60° C. The precipitated solids are separated by filtration at about 60° C. and dried. Characteristics of the product before and after treatment are shown in the following table, Table VI.

TABLE VI

|  | Initial Product | Final Product |
|---|---|---|
| Particle Size | 5-20 microns | 10-100 microns. |
| Dispersion Rating | poor | fair-good. |
| Incorporation Time | 4+minutes | 4+minutes. |

EXAMPLE 5

The procedure of Example 1 is followed, with the exception that the separated chlorobenzene phase is steam distilled until the chlorobenzene is removed. MBTS precipitates in the aqueous layer during distillation and is collected by filtration and dried. Characteristics of the MBTS, before and after treatment, are shown in the following table, Table VII.

TABLE VII

|  | Initial Product | Final Product |
|---|---|---|
| Particle Size | 5-30 microns | 10-200 microns. |
| Dispersion Rating | poor | good. |
| Incorporation Time | 4+minutes | 1 min., 45 sec. |

EXAMPLE 6

The procedure of Example 5 is followed, with the exception that steam distillation is carried out on the combined phases without separation of the chlorobenzene solution from the aqueous brine. MBTS precipitates and is collected by filtration and dried. Characteristics of the MBTS before and after the treatment are shown in the following table, Table VIII.

TABLE VIII

|  | Initial Product | Final Product |
|---|---|---|
| Particle Size | 5-20 microns | 10-200 microns. |
| Dispersion Rating | poor | good. |
| Incorporation Time | 4+minutes | 2 min., 30 sec. |

EXAMPLE 7

A mixture obtained by chlorine oxidation in aqueous phase of sodium MBT and comprising 3,000 parts of a 3% aqueous sodium chloride solution containing 150 parts of MBTS is heated with stirring to 85° C. and 1200 parts of chlorobenzene is added and the mixture is quickly heated to 95° C. This temperature is maintained with stirring until all of the MBTS had dissolved in the chlorobenzene. The resulting mixture is continuously fed at the rate of 50 parts per minute into a closed vessel containing water at 100° C. and into which steam is introduced through a steam leg at a rate sufficient to remove the chlorobenzene at the same rate it is being introduced. At the completion of the addition and steam distillation, resultant precipitated MBTS is separated by filtration and dried. Characteristics of the MBTS products recovered with and without this treatment are shown in the following table, Table IX.

TABLE IX

|  | Untreated Product | Treated Product |
|---|---|---|
| Particle Size | 5-20 microns | 10-210 microns. |
| Dispersion Rating | poor | good. |
| Incorporation Time | 4+minutes | 3 min., 15 sec. |

EXAMPLE 8

In a continuous process, a 5% slurry of MBTS solids in a 3% aqueous sodium chloride brine is fed at the rate of 6 parts per minute simultaneously with 2.6 parts per minute of chlorobenzene, both streams being at 95° C., into an efficient commercially-available mixing unit. The resulting two-phase stream is continuously fed to a closed kettle equipped with an agitator, a steam feed leg, a condenser take-off line and a bottom outlet valve. Steam feed to the kettle is 145 parts per hour of 120 lb. steam. The liquid level in the kettle is maintained by adjustment of the take-off rate. Under these conditions, a stream of recrystallized MBTS in an aqueous brine solution containing less than 0.05% solvent is continuously removed. The MBTS is separated from the brine by filtration and dried. Characteristics of the MBTS product obtained from the slurry before and after this treatment are shown in the following table, Table X.

TABLE X

|  | Untreated Product | Treated Product |
| --- | --- | --- |
| Particle Size | 5-20 microns | 10-100 microns. |
| Dispersion Rating | poor | fair-good. |
| Incorporation Time | 4+ minutes | 4+ minutes. |

EXAMPLE 9

The process of Example 7 is repeated but with 2.5 parts of zinc palmitate being dissolved in each 1200 parts chlorobenzene before the solvent is added to the MBTS slurry. After removal of the solvent, the zinc palmitate is recovered with the recrystallized MBTS. Product characteristics are shown in Table XI.

TABLE XI

|  | Untreated Product | Treated Product |
| --- | --- | --- |
| Particle Size | 5-20 microns | 10-200 microns. |
| Dispersion Rating | poor | good. |
| Incorporation Time | 4+ minutes | 2 minutes. |

EXAMPLE 10

The process of Example 7 is repeated except that 2.5 parts of zinc palmitate is dispersed in water with the aid of a nonionic wetting agent and is added to the slurry of MBTS in the aqueous brine before adding the solvent. Upon removal of the solvent, the zinc palmitate is recovered with the recrystallized MBTS. Product characteristics are shown in Table XII.

TABLE XII

|  | Initial Product | Final Product |
| --- | --- | --- |
| Particle Size | 5-20 microns | 10-100 microns. |
| Dispersion Rating | poor | fair-good. |
| Incorporation Time | 4+ minutes | 4+ minutes. |

EXAMPLE 11

The process of Example 7 is repeated except that to the slurry of recrystallized MBTS in the brine there is added a slurry of 2.5 parts of zinc palmitate in 100 parts of water and the mixture is stirred for about 10 minutes. Resultant MBTS-zinc palmitate product is separated by filtration and dried. The product comparison is shown in Table XIII.

TABLE XIII

|  | Initial Product | Final Product |
| --- | --- | --- |
| Particle Size | 5-20 microns | 10-210 microns. |
| Dispersion Rating | poor | good. |
| Incorporation Time | 4+ minutes | 2 minutes. |

I claim:

1. A process for improving the dispersibility in rubber of 2,2'-dithiobisbenzothiazole having a particle size range substantially wholly below 20 microns which comprises suspending said 2,2-dithiobisbenzothiazole in an aqueous slurry; combining said slurry with an inert, water-immiscible organic solvent 2,2'-dithiobisbenzothiazole, the amount of solvent used being at least sufficient to dissolve substantially all said 2,2'-dithiobisbenzothiazole; agitating the resultant mixture until dissolution of said 2,2'-dithiobisbenzothiazole substantially ceases; removing the solvent by distillation, whereby 2,2'-dithiobisbenzothiazole precipitates and separating resultant precipitate from the residual aqueous liquor.

2. A process according to claim 1 in which the aqueous medium of said slurry contains dissolved inorganic salts.

3. A process for improving the dispersibility in rubber of 2,2'-dithiobisbenzothiazole as obtained in aqueous slurry by chlorine oxidation of sodium mercaptobenzothiazole and having a particle size range substantially wholly below 20 microns which comprises combining said slurry with an inert, water-immiscible organic solvent for 2,2'-dithiobisbenzothiazole, the amount of solvent used being at least sufficient to dissolve substantially all said 2,2'-dithiobisbenzothiazole; agitating the resultant mixture until dissolution of said 2,2'-dithiobisbenzothiazole ceases; removing the solvent by distillation, whereby 2,2'-dithiobisbenzothiazole precipitates and separating resultant precipitate from the residual aqueous liquor.

4. A process according to claim 3 in which the aqueous medium of said slurry contains dissolved inorganic salts.

5. A process according to claim 3 in which said slurry is the product slurry obtained in said chlorine oxidation.

6. A process according to claim 3 in which the distillation is carried out in the presence of the aqueous brine and the 2,2'-dithiobisbenzothiazole is separated from the aqueous brine after removal of the solvent.

7. A process for improving the dispersion of 2,2-dithiobisbenzothiazole in rubber comprising contacting an aqueous slurry of 2,2'-dithiobisbenzothiazole having a particle size range substantially wholly below 20 microns with a chemically inert, water-immiscible organic solvent at an elevated temperature, the amount of solvent being sufficient to dissolve the 2,2'-dithiobisbenzothiazole, cooling the solvent until the 2,2'-dithiobisbenzothiazole precipitates and separating the solid 2,2'-dithiobisbenzothiazole from the liquid medium.

8. A process according to claim 7 in which said aqueous slurry of 2,2'-dithiobisbenzothiazole contains dissolved inorganic salts.

9. A process according to claim 7 in which the hot organic solvent solution of 2,2'-dithiobisbenzothiazole is cooled in the presence of the aqueous liquor.

References Cited in the file of this patent

UNITED STATES PATENTS

| | | |
| --- | --- | --- |
| 1,661,998 | Carson | Mar. 6, 1928 |
| 1,880,421 | Clifford | Oct. 4, 1932 |
| 1,963,019 | Harman | June 12, 1934 |
| 2,265,347 | Carr | Dec. 9, 1941 |
| 2,304,426 | Sibley | Dec. 8, 1942 |
| 2,386,959 | Jansen | Oct. 16, 1945 |
| 2,475,582 | Chao | July 12, 1949 |
| 2,520,095 | Hardman | Aug. 22, 1950 |
| 2,730,527 | Kinstler | Jan. 10, 1956 |
| 2,762,855 | Creed | Sept. 11, 1956 |
| 2,840,564 | Kinstler et al. | June 24, 1958 |
| 2,918,513 | Cooper et al. | Dec. 22, 1959 |
| 3,062,825 | Hardman et al. | Nov. 6, 1962 |